(12) United States Patent
Qi

(10) Patent No.: US 6,851,941 B2
(45) Date of Patent: Feb. 8, 2005

(54) APPARATUS FOR CURING FIBROUS INSULATION

(75) Inventor: Weigang Qi, Westerville, OH (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 128 days.

(21) Appl. No.: 10/404,205

(22) Filed: Mar. 31, 2003

(65) Prior Publication Data

US 2004/0191350 A1 Sep. 30, 2004

(51) Int. Cl.[7] ............................. B29C 43/48; B30B 5/06
(52) U.S. Cl. .................... 425/185; 156/583.5; 425/188; 425/193; 425/371
(58) Field of Search .......................... 425/75, 185, 188, 425/193, 371; 156/381, 581, 555, 583.5

(56) References Cited

U.S. PATENT DOCUMENTS

| | | |
|---|---|---|
| 1,348,898 A | 8/1920 | Routt |
| 3,004,878 A | 10/1961 | Tomlinson |
| 3,661,491 A | 5/1972 | Troyer |
| 4,007,543 A | 2/1977 | McClay, Jr. |
| 4,147,582 A * | 4/1979 | Brollo .......................... 156/555 |
| 4,226,662 A | 10/1980 | McCort |
| 4,490,927 A | 1/1985 | Kissell |
| 4,983,081 A | 1/1991 | Cunningham, Jr. |
| 5,453,231 A * | 9/1995 | Douglas ...................... 425/193 |
| 5,625,999 A | 5/1997 | Buzza et al. |
| 5,762,980 A | 6/1998 | Bielfeldt |
| 6,270,865 B1 | 8/2001 | Noonan et al. |

* cited by examiner

Primary Examiner—James P. Mackey
(74) Attorney, Agent, or Firm—Inger H. Eckert; Maria C. Gasaway (57) ABSTRACT

An improved apparatus for curing fibrous insulation material includes an oven, and a lower conveyor mounted to travel through the oven. The lower conveyor includes a plurality of flights having a support surface for supporting fibrous insulation material. An upper conveyor is mounted to travel through the oven and has a plurality of flights opposite the flights of the lower conveyor. Each flight of the upper conveyor includes a support surface. The upper and lower conveyors are arranged to press the fibrous insulation material between the respective support surfaces as the conveyors carry the fibrous insulation material through the oven. A plurality of molding members are configured to mold a shape into a surface of the fibrous insulation material, and are releasably retained on the flights by a plurality of retaining members. The retaining members are automatically releasable when the flights are moving, such that the releasing of the retaining members unlocks the molding members from the flights.

16 Claims, 6 Drawing Sheets

APPARATUS FOR CURING FIBROUS INSULATION

TECHNICAL FIELD

This invention relates to a method and apparatus for curing fibrous mineral material in an oven. More particularly, this invention relates to a method and apparatus for forming a sheet of duct board material having a shiplap joint along an edge.

BACKGROUND OF THE INVENTION

It is common practice in the manufacture of duct board material, such as a duct board panel, to pass mineral fiber insulation between a pair of foraminous conveyors, or belts, mounted for travel through the curing oven. Hot gases are passed through the insulation to more effectively cure the binder in the insulation. Associated with the oven are flows of hot curing gases, usually air, which travel generally upwardly or downwardly through the insulation. A common construction for the belts is that of foraminous flights connected in series and driven by a chain. The ends of the flights are mounted on wheels which ride in tracks running the length of the oven.

In some mineral fiber insulation curing ovens, shiplap shoes are attached to opposite edges of the opposing belts to form a continuous kerf or shiplap edge into each side of the cured insulation product, which is typically a duct board panel. It is often desirable to produce a duct board panel having no shiplap edges, or duct board panels having different sizes of shiplap edges, on one manufacturing machine. However, shiplap shoes are typically permanently welded to each flight. Alternately, shiplap shoes are known to be bolted to each flight. Each time there is a job change, the shiplap shoes must be removed and replaced. However, removal of such bolted shiplap shoes is a time consuming and costly process. Reattaching the same or different shiplap shoes to the belts is also a time consuming and costly process. Accordingly, it is desired to provide an improved method and apparatus for attaching a shiplap shoe to a flight.

SUMMARY OF THE INVENTION

This invention relates to an improved apparatus for curing fibrous insulation material. The apparatus includes an oven, and a lower conveyor mounted to travel through the oven. The lower conveyor includes a plurality of flights for supporting fibrous insulation material, and the flights include a support surface. An upper conveyor is mounted to travel through the oven and has a plurality of flights opposite the flights of the lower conveyor. Each flight of the upper conveyor includes a support surface. The upper and lower conveyors are arranged to press the fibrous insulation material between the respective support surfaces as the conveyors carry the fibrous insulation material through the oven. A plurality of molding members are mountable on the flights, and are configured to mold a shape into a surface of the fibrous insulation material as the fibrous insulation material is being carried through the oven. A plurality of retaining members releasably retains the molding members on the flights. The retaining members are configured to be automatically releasable when the lower and upper flights are moving, such that the releasing of the retaining members unlocks the molding members from the flights.

Various objects and advantages of this invention will become apparent to those skilled in the art from the following detailed description of the preferred embodiments, when read in light of the accompanying drawings.

DETAILED DESCRIPTION AND PREFERRED EMBODIMENTS OF THE INVENTION

Figure 1:
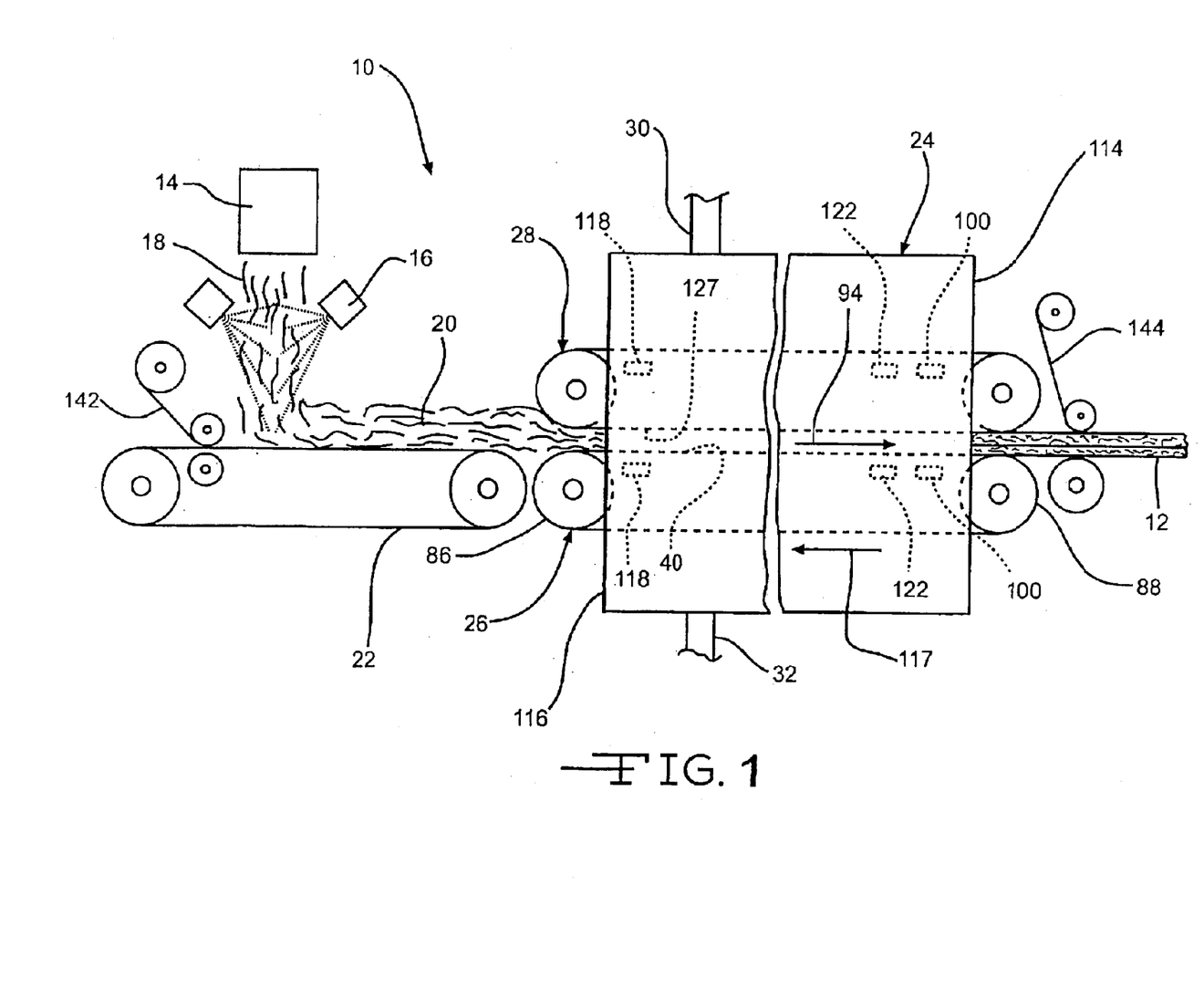
FIG. 1 is a schematic elevational view of an apparatus for curing fibrous insulation material according to the invention.

Referring now to the drawings, there is shown in FIG. 1 an apparatus 10 for manufacturing a sheet of duct board material 12 according to the invention. In the illustrated manufacturing process, molten glass is supplied from a furnace (not shown) via a forehearth (not shown) to a fiberizer 14. Binder applicators 16 then apply, preferably by spraying, a binder on the veils of fibers 18 produced by the fiberizer 14. The fibers are collected as pack 20 on a conveyor 22. The binder can be a phenol-formaldehyde binder, or any other desired type of binder. It will be appreciated that the pack 20 can be produced by any desired alternate method, many of which are known in the art.

The uncured pack 20 is then passed through an oven 24 between a lower conveyor or belt 26 and an upper conveyor or belt 28, and emerges as a cured sheet of insulation material 12. Since the apparatus of the invention is primarily used for manufacturing duct board products, the cured insulation material will be referred to as duct board material. The pack 20 is cured within the oven 24 by hot curing gases, such as hot air. The hot curing gases can be supplied to the oven 24 from a source of hot gas (not shown) via a supply duct 30. The curing gases can be removed from the oven 24 via an exhaust duct 32.

The lower belt 26 and the upper belt 28 are preferably foraminous belts, although such foraminous belts are not required. Any conveyor means suitable for carrying the uncured pack 20 through the oven 24, while enabling the flow of curing gases through the pack 20, can be used for the belts 26 and 28.

Figure 2:
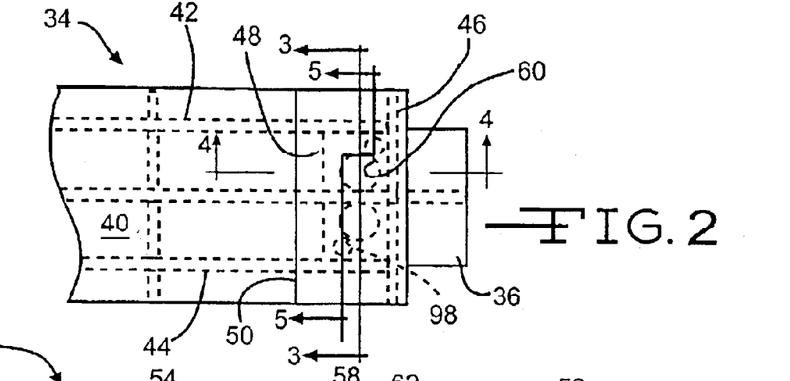
FIG. 2 is a plan view of a flight showing a shiplap shoe according to the invention.
Figure 3:
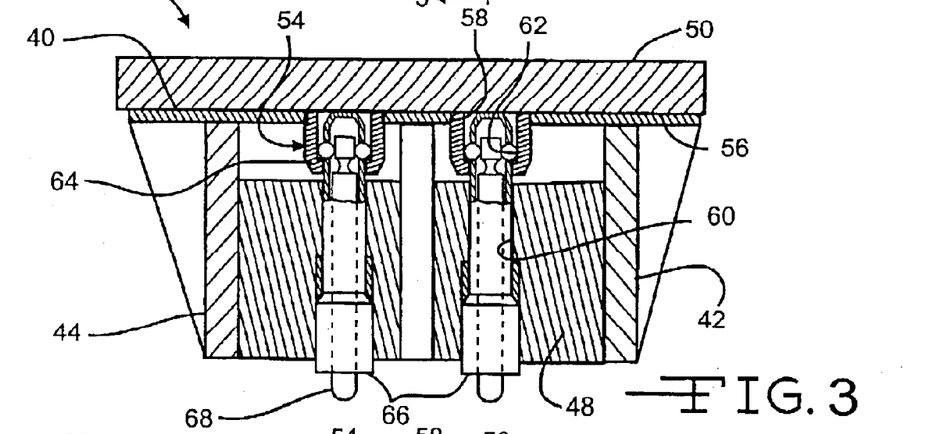
FIG. 3 is a cross sectional view taken along line 3—3 of FIG. 2, showing release pin assemblies according to the invention.

Preferably, the lower belt 26 is comprised of a plurality of lower flights, such as the exemplary lower flight 34 illustrated in FIGS. 2 through 5, inclusive. Each lower flight 34 can have an elongated end, such a flight tab 36. Preferably, each end of the lower flight 34 includes a flight tab 36. Support means for supporting the lower flights 34 are positioned within the oven 24. The support means can be comprised of wheels (not shown) connected by axles to the flight tab and riding in tracks (not shown). Such wheels and flights can be moved or pulled through the oven 24 by any desired means, such as a chain As best shown in FIGS. 2 and 3, each lower flight 34 further includes a lower support surface 40. Preferably, the lower support surface 40 is attached to a front flight wall 42, a rear flight wall 44, and opposing side flight walls 46. The flight tab 36 extends outwardly from the side flight walls 46. A mounting block 48 is disposed between the front and rear flight walls 42 and 44, and the side flight wall 46. Preferably, the mounting block 48 is attached to inner surfaces of the front, rear, and side flight walls, 42, 44, and 46, respectively.

Figure 4:
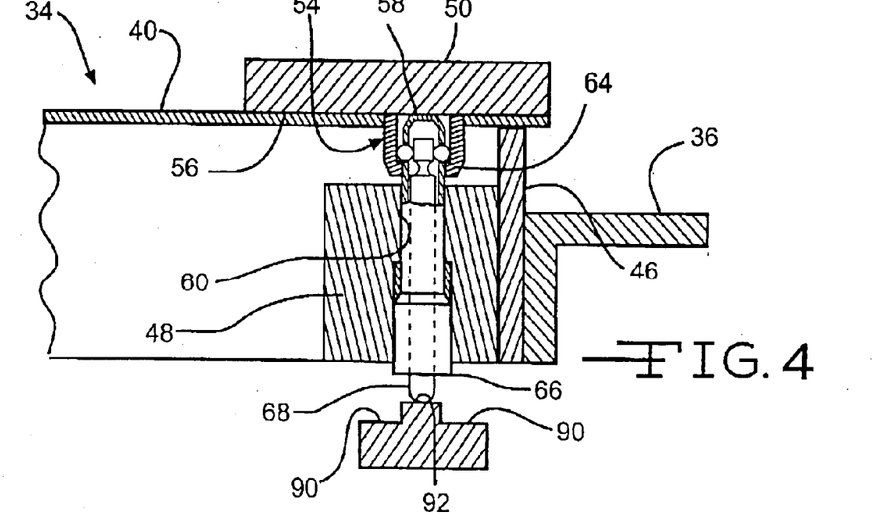
FIG. 4 is a cross sectional view taken along line 4—4 of FIG. 2, showing a release pin assembly and a first support ramp according to the invention.
Figure 10:
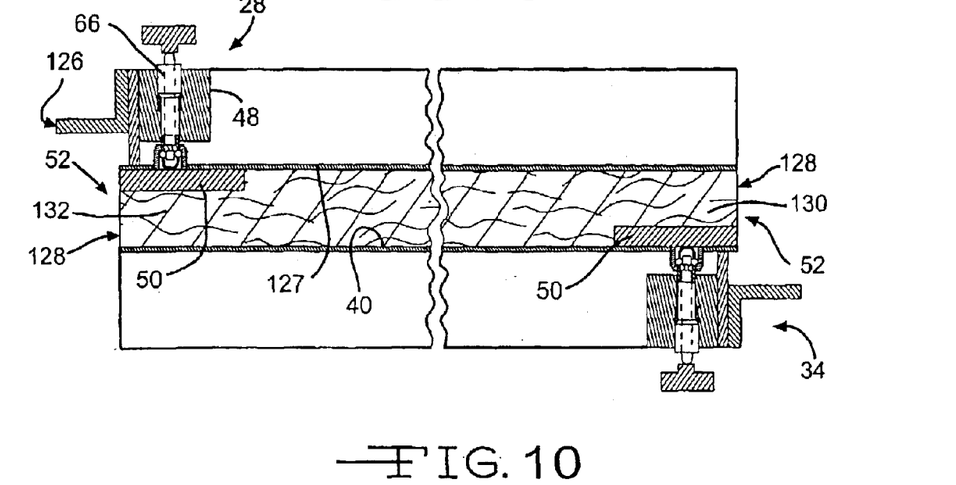
FIG. 10 is a cross sectional elevational view of the upper and lower flights illustrated in FIG. 1, showing a male and a female shiplap edge formed in the sheet of insulation material.

A molding member is releasably attached to the lower support surface 40 at one end thereof, as shown in FIGS. 3 and 4. In the exemplary embodiment illustrated, the molding member is a shiplap shoe 50 for forming a continuous kerf or shiplap edge 52 into a side of the sheet of duct board material 12, as best shown in FIG. 10. It will be appreciated however, that the molding member can be any desired molding member for forming any desired shape in any surface or edge of the sheet of duct board material 12.

A plurality of collars 54 extend downwardly from a lower surface 56 of the shiplap shoe 50, and through collar apertures 58 in the lower support surface 40. A retaining member for releasably retaining each shiplap shoe 50 to each lower flight 34 is disposed within a first bore 60 formed in the mounting block 48. The collar 54 defines a generally cylindrical collar bore 62 having a reduced diameter opening 64.

Figure 6:
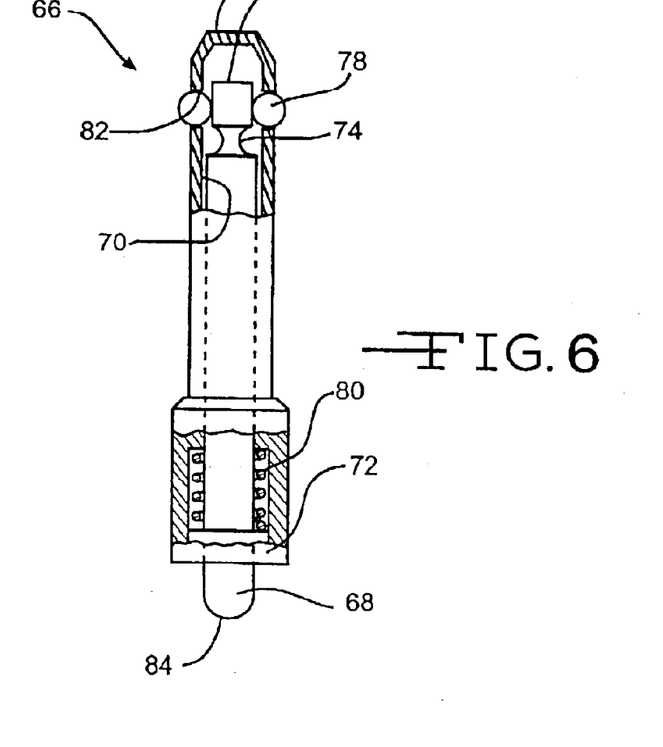
FIG. 6 is an enlarged elevational view, partially in cross section, showing the release pin assembly illustrated in FIGS. 3 and 4.

Preferably, the retaining member is a biased retaining member, such as a spring biased release pin assembly 66 as shown in FIGS. 3 and 4. The release pin assembly 66 is preferably mounted within the first bore 60 of the mounting block 48. As best shown in FIG. 6, the release pin assembly 66 includes an inner pin 68 slidably mounted within an axial bore 70 formed in a release pin body 72. A circumferential groove 74 is formed in an outer surface of the inner pin 68 adjacent a first end 76 of the inner pin 68. A plurality of locking balls 78 is disposed within the pin body 72. A spring 80 is disposed within the axial bore 70 and urges a second end 84 of the inner pin 68 downwardly, as viewed in FIG. 6, and toward a first or locked position.

The release pin assembly 66 is movable between the locked position, as shown in FIG. 6, and an unlocked position. In the locked position, a portion of each locking ball 78 extends radially outward of the pin body 72 through ball apertures 82. When a force is applied to the second end 84 of the inner pin 68, the release pin assembly 66 is moved to the unlocked position. In the unlocked position, the inner pin 68 is urged upwardly against the force of the spring 80, thereby causing the locking balls 78 to move inward of the pin body 72 and into the groove 74.

In operation, a first end 85 of the release pin assembly 66 is inserted into the collar 54, such that the locking balls 78 are positioned between the lower surface 56 of the shiplap shoe 50 and the reduced diameter opening 64 of the collar 54. When the release pin assembly 66 is in the locked position, the first end 85 of the release pin assembly 66 is thereby retained within the collar 54, and the shiplap shoe 50 is releasably attached to the lower flight 34. As will be described herein, when the release pin assembly 66 is in the unlocked position, the collar 54 of the shiplap shoe 50 can be moved outward (upwardly as viewed in FIG. 7) from the release pin assembly 66, and the shiplap shoe 50 is no longer attached to the lower flight 34.

Figure 5:
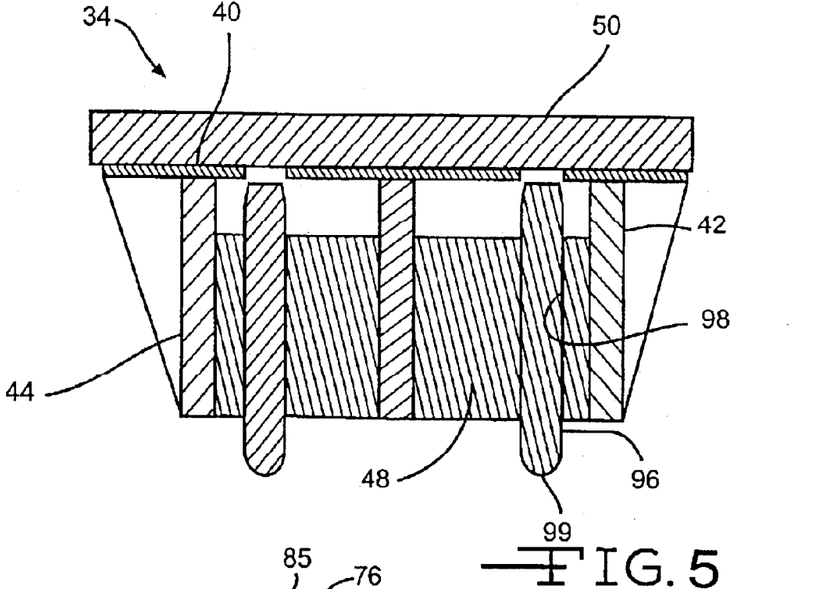
FIG. 5 is a cross sectional view taken along line 5—5 of FIG. 2, showing a lift pin according to the invention.

As shown in FIG. 5, the lower flight 34 further includes a plurality of lift pins 96 disposed between the lower support surface 40 and the shiplap shoe 50. Preferably, the each lift pin 96 is slidably disposed in a second bore 98 formed in the mounting block 48.

Figure 7:
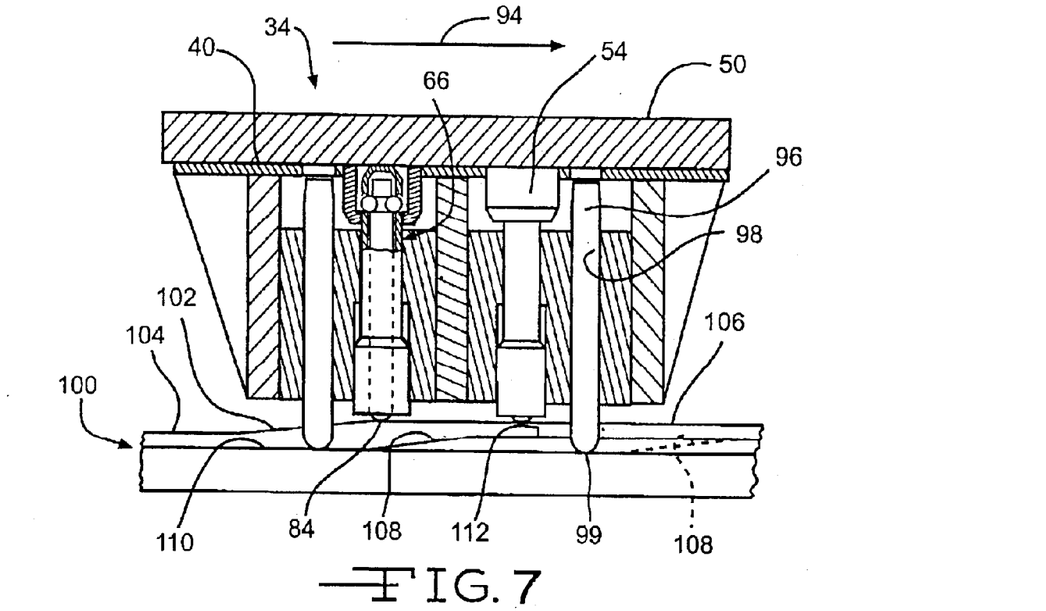
FIG. 7 is an end view, partially in cross section, of the flight illustrated in FIG. 2, showing the first ramp member.

As shown in FIG. 7, the lower belt 26 can include a first ramp 100. The first ramp 100 includes a first tapered portion or ramp 102 disposed between a first upper horizontal surface portion 104 and a second upper horizontal surface portion 106. A second ramp 108 is disposed between a first lower horizontal surface portion 110 and a second lower horizontal surface portion 112.

Preferably, the first ramp 100 can be selectively moved into contact with a lower surface of the lower flights 34, such that the shiplap shoe 50 can be automatically released from each lower flight 34. The first ramp 100 is preferably installed in the lower belt 26 adjacent an outlet end 114 of the oven 24. The first ramp 100 can be moved by any desired means, such as a screw jack (not shown), or a rotating wheel (not shown).

In operation, the lower belt 26 moves in the direction of the arrow 94. When desired, the first ramp 100 can be moved toward the lower portion of the lower flights 34, as shown in FIG. 7. The second ends 84 of the inner pins 68 then contact the first ramp 100 and slide along the first upper horizontal surface portion 104, along the first ramp 102, to the second upper horizontal surface portion 106. When engaging the second upper horizontal surface portion 106, the inner pin 68 is thereby urged upwardly against the force of the spring 80 and into the unlocked position.

Similarly, the second ends 99 of the lift pins 96 slide along the first lower horizontal surface portions 110 in a first static position, as shown in FIG. 7. The second ends 99 of the lift pins 96 then slide along the second ramps 108 to the second lower horizontal surface portions 112. When engaging the second lower horizontal surface portions 112, the lift pins 96 are moved upwardly, as viewed in FIG. 7, and into a second or lift position, thereby urging the shiplap shoes 50 away from the lower support surfaces 40. The shiplap shoe 50 then preferably falls away from the lower flight 34 as the lower belt 26 returns toward an inlet end 116 of the oven 24 in the direction of the arrow 117.

Figure 8:
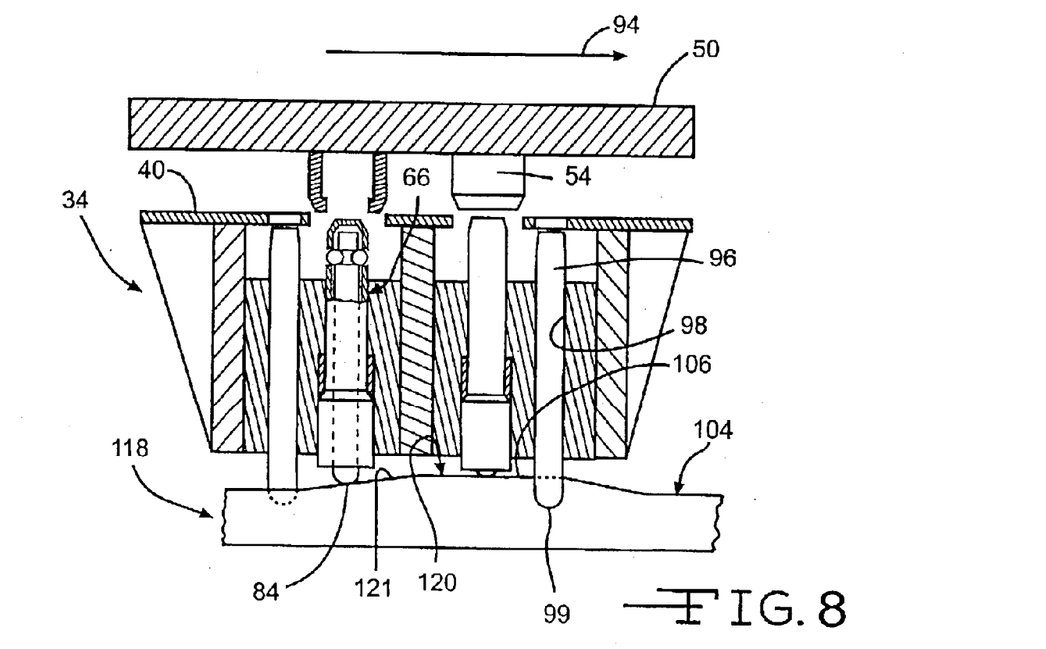
FIG. 8 is an end view, partially in cross section, of the flight illustrated in FIG. 2, showing the second ramp member.

It will be appreciated that a second ramp 118, as shown in FIG. 8, can be provided. The second ramp 118 includes a third ramp surface 120. Preferably, the third ramp surface 120 is disposed between sections of the first upper horizontal surface portion 104, and includes the second upper horizontal surface portion 106. If desired, the second ramp 118 can include a leading ramp surface 121, as shown in FIG. 8. Preferably, the second ramp 118 can be selectively moved into contact with the lower surface of the lower flights 34, such that the shiplap shoe 50 can be easily attached to each lower flight 34. The second ramp 118 is preferably installed in the lower belt 26 adjacent the inlet end 116 of the oven 24.

In operation, the lower belt 26 moves in the direction of the arrow 94. When desired, the second ramp 118 can be moved toward the lower portion of the lower flights 34, as shown in FIG. 8. The second ends 84 of the inner pins 68 then contact the leading ramp surface 121 of the third ramp surface 120 and slide along the second upper horizontal surface portion 106, thereby urging the pin 68 against the force of the spring 80 and into the unlocked position. When the release pin assembly 66 is in the unlocked position, the shiplap shoe 50 can be moved (downwardly as viewed in FIG. 8) toward the lower flight 34, such that the first end 85 of the release pin assembly 66 can be inserted into the collar 54. The second ends 84 of the inner pins 68 continue to slide along the third ramp surface 120, until the pins 68 are no longer in contact with the second ramp 118, thereby moving the release pin assembly 66 to the locked position, and installing the shiplap shoe 50 to its respective lower flight 34.

Figure 9:
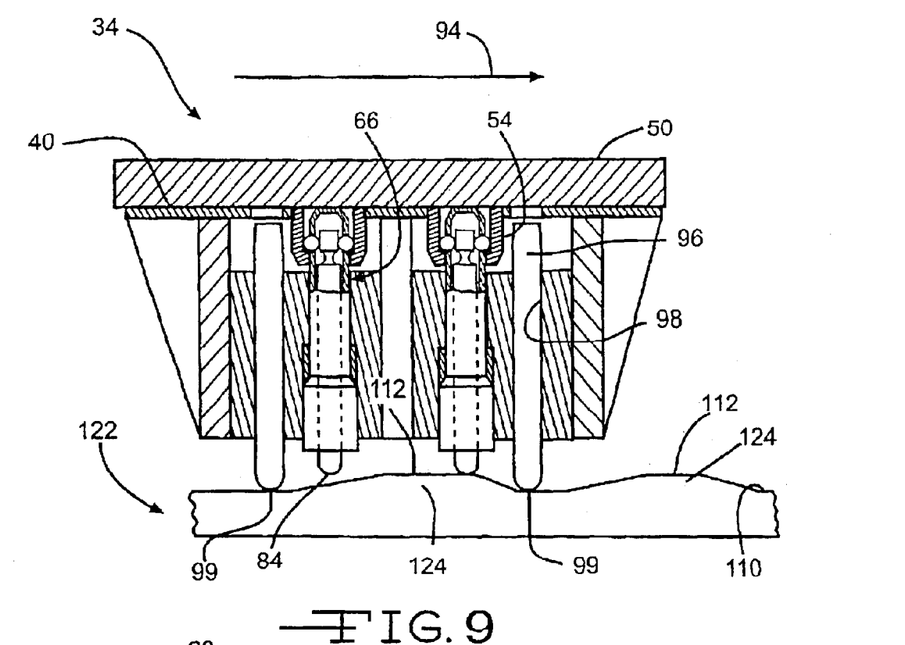
FIG. 9 is an end view, partially in cross section, of the flight illustrated in FIG. 2, showing the third ramp member.

It will be further appreciated that a third ramp 122, as shown in FIG. 9, can be provided to ensure that the shiplap shoe 50 is securely attached to the lower flight 34. The third ramp 122 is preferably installed in the lower belt 26 adjacent the outlet end 114 of the oven 24. However, the third ramp 122 can be installed at any location intermediate the inlet end 116 and the outlet end 114 of the oven 24. The third ramp 122 includes a bump or fourth ramp surface 124. Preferably, the ramp surface 124 includes the second lower horizontal surface portion 112, and is disposed between sections of the first lower horizontal surface portion 110. Preferably, the third ramp 122 can be selectively moved into contact with the lower surface of the lower flights 34, such that the attachment of the shiplap shoe 50 can be easily tested.

In operation, the lower belt 26 moves in the direction of the arrow 94. When desired, the third ramp 122 can be moved toward the lower portion of the lower flights 34, as shown in FIG. 9. The second ends 99 of the lift pins 96 then contact the fourth ramp surface 124. When the second ends 99 of the lift pins 96 engage the fourth ramp surface 124, and the second lower horizontal surface portion 112, the lift pins 96 are moved upwardly (as viewed in FIG. 9) and an upward force is applied against the shiplap shoe 50. When the shiplap shoe 50 and associated release pin assemblies 66 have been properly mounted, the upward force of the lift pins 96 on the shiplap shoes 50 will not disengage the shiplap shoes 50 from the lower flight 34. The lift pins 96 continue to slide over the fourth ramp surface 124 such that the upward force is no longer applied against the shiplap shoe 50.

In the illustrated embodiment, the first, second, and third ramps, 100, 118, and 122, respectively, have been described as being installed on the lower belt 26. However, it will be appreciated that the first, second, and third ramps, 100, 118, and 122, respectively, can be installed in any desired location, such that the ramps, 100, 118, and 122, can be selectively moved into contact with a lower surface of the lower flights 34, as herein described.

The upper belt 28 is comprised of a plurality of upper flights 126, as shown in FIG. 10. The upper flights 126 are substantially identical to the lower flights 34 and will not be described in detail herein. Each upper flight 126 includes the mounting block 48 adjacent an upper support surface 127, the shiplap shoe 50, the release pin assemblies 66, and the lift pins (not shown in FIG. 10). The upper belt 28 can also included the first, second, and third ramps, 100, 118, and 122, respectively, as shown in FIG. 1.

When the uncured pack 20 is pressed between the lower and the upper flights, 34 and 126, the shiplap shoes 50 form the shiplap edge 52 along sides 128 of the pack 20. The shiplap shoes 50 of the lower flights preferably form one half of a shiplap joint in each side 128 of the sheet of duct board material 12 (e.g. either one of a male shiplap edge 130 or a female shiplap edge 132, as best shown in FIG. 10). The shiplap shoes 50 of the upper flights 126 form the other half of the shiplap joint in the opposite side of the sheet of duct board material 12.

In the exemplary embodiment illustrated, the mold member is a shiplap shoe 50. However, it will be appreciated that the molding member can be any desired molding member for molding any desired shape into any surface or edge of the sheet of duct board material 12.

Figure 11:
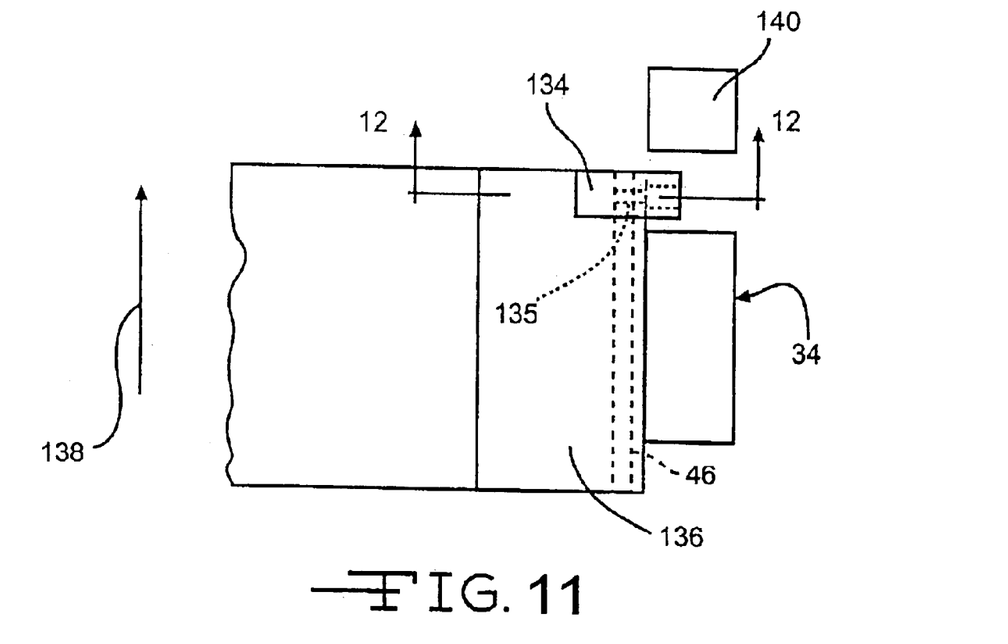
FIG. 11 is a plan view of a flight showing an alternate embodiment of the shiplap shoe and retaining member.
Figure 12:
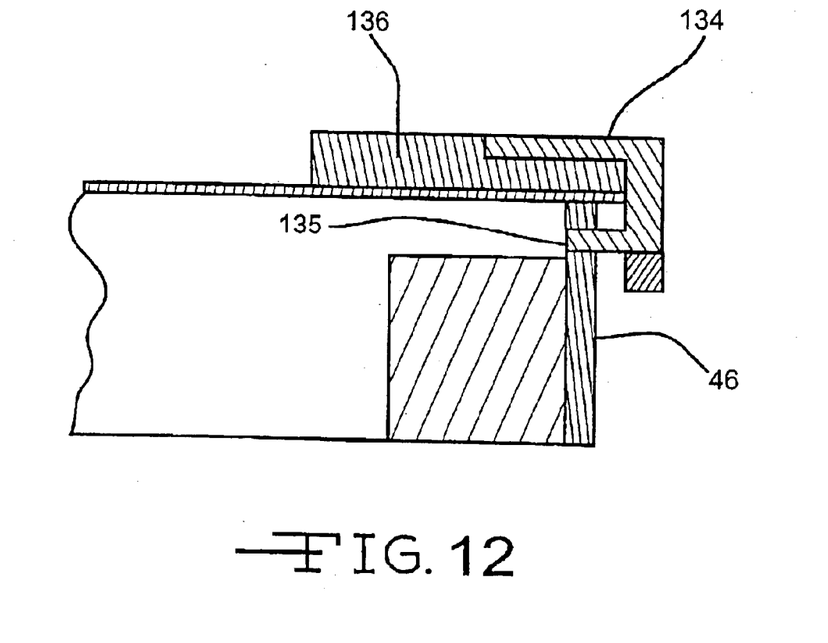
FIG. 12 is a cross sectional view taken along line 12—12 of FIG. 11, showing the retaining member.

An alternate embodiment of the retaining member is illustrated generally at 134 in FIGS. 11 and 12. As illustrated, the retaining member 134 is pivotally mounted to a flight, such as to the side flight wall 46 of the lower flight 34, and engages an upper surface of the shiplap shoe 136. In operation, the lower belt 26 moves in the direction of the arrow 138, as shown in FIG. 11. Preferably, the retaining member 134 engages an actuator 140 as each flight 34 of the lower belt 26 approaches the outlet end 114 of the oven 24. The actuator 140 causes the retaining member 134 to pivot about a pivot member 135, thereby releasing the retaining member 134 from the shiplap shoe 136, and detaching the shiplap shoe 136 from the lower flight 34. The shiplap shoe 136 then preferably falls away from the lower flight 34 as the lower belt 26 returns toward an inlet end 116 of the oven 24 in the direction of the arrow 117, as shown in FIG. 1.

If desired, a mat facing 142 can be applied to an inner surface of the sheet of duct board material 12, as shown in FIG. 1. The mat facing 142 can be any desired mat facing such as polyester/glass mat.

After curing in the oven 24, a second layer of material, such as a foil-scrim-kraft layer (FSK) 144, can be applied to an exterior surface of the sheet of duct board material 12, as shown in FIG. 1. Any desired conventional adhesive can be used to adhere the FSK layer 144 to the sheet of duct board material 12.

If desired, channels or grooves, such as V-shaped grooves can be formed in the inner surface of the sheet of duct board material 12 for folding or bending the sheet of duct board material 12 into an air duct.

The principle and mode of operation of this invention have been described in its preferred embodiments. However, it should be noted that this invention may be practiced otherwise than as specifically illustrated and described without departing from its scope.

What is claimed is:

1. An apparatus for curing fibrous insulation material, the apparatus comprising:

an oven;

a lower conveyor mounted to travel through the oven and having a plurality of flights for supporting fibrous insulation material, the flights including a support surface;

an upper conveyor mounted to travel through the oven and having a plurality of flights opposite the flights of the lower conveyor, each flight including a support surface, wherein the upper and lower conveyors are arranged to press the fibrous insulation material between the respective support surfaces as the conveyors carry the fibrous insulation material through the oven; and a plurality of molding members mountable on the flights, the molding members being configured to mold a shape into a surface of the fibrous insulation material as the fibrous insulation material is being carried through the oven; and a plurality of retaining members for releasably retaining the molding members on the flights, the retaining members being configured to be automatically releasable when the lower and upper flights are moving, and wherein the releasing of the retaining members unlocks the molding members from the flights.

2. The apparatus according to claim 1, wherein the retaining members are biased retaining members.

3. The apparatus according to claim 1, wherein the retaining members are spring biased.

4. The apparatus according to claim 1, wherein the retaining members are pivotally mounted to the flights.

5. The apparatus according to claim 1, further including an actuator for automatically releasing the retaining members, whereby when the retaining members contact the actuator, the retaining members are automatically released from the molding members.

6. The apparatus according to claim 5, wherein the actuator is a first ramp.

7. The apparatus according to claim 5, wherein the actuator is selectively movable relative to the flights.

8. The apparatus according to claim 5, wherein the flights further include lift pins disposed between the actuator and the molding members, wherein the actuator moves the lift pins between a first static position and a second lift position whereby the lift pin urges the molding members away from the support surfaces of the flights.

9. The apparatus according to claim 8, wherein the actuator is a first ramp.

10. The apparatus according to claim 9, wherein the first ramp includes a first tapered portion disposed between a first substantially horizontal portion and a second substantially horizontal portion, and a second tapered portion disposed between a third substantially horizontal portion and a fourth substantially horizontal portion, wherein the retaining members engage the first substantially horizontal portion in the first position and engage the second substantially horizontal portion in the second position, and wherein the lift pin engages the third substantially horizontal portion in the first static position and engages the fourth substantially horizontal portion in the second lift position.

11. The apparatus according to claim 8, wherein the lift pin is disposed within a bore in a body portion of the flights.

12. The apparatus according to claim 1, wherein the molding members are shiplap shoes for forming one of a male shiplap joint and a female shiplap joint.

13. The apparatus according to claim 12, wherein the shiplap shoes include an upper surface, a lower surface, and a collar extending from the lower surface, the collar configured to receive a portion of the retaining members.

14. The apparatus according to claim 5, wherein the retaining members comprise release pin assemblies, and wherein a first end of the release pin assemblies engages the molding members, the release pin assemblies having a first position wherein the molding members are attached to the flights and a second position wherein the molding members are detached from the flights.

15. The apparatus according to claim 14, wherein the release pin assembly is disposed between the actuator and the support surface, wherein the flights further include a body portion adjacent the support surface, and wherein the release pin assemblies are mounted to the body portion of the flights.

16. The apparatus according to claim 1, further including a second ramp selectively moveable relative to the flights, wherein the second ramp has a first position such that the retaining members contact the second ramp and are automatically attached to the molding members, and wherein the second ramp has a second position such that the retaining members are not in contact with the second ramp.

* * * * *